Patented Nov. 10, 1925.

1,560,981

UNITED STATES PATENT OFFICE.

ANTONIUS DE GRAAFF AND DIRK LELY, JR., OF EINDHOVEN, NETHERLANDS, ASSIGNORS, BY MESNE ASSIGNMENTS, TO GENERAL ELECTRIC COMPANY, A CORPORATION OF NEW YORK.

MANUFACTURE OF INCANDESCENT LAMPS.

No Drawing.   Application filed November 17, 1920.   Serial No. 424,671.

*To all whom it may concern:*

Be it known that we, ANTONIUS DE GRAAFF and DIRK LELY, Jr., both subjects of the Queen of the Netherlands, residing at Eindhoven, in the Province of North Brabant, in the Kingdom of the Netherlands, have invented certain new and useful Improvements in the Manufacture of Incandescent Lamps, and we do hereby declare that the following is a full, clear, and exact description of the same.

It is known that even small quantities of water vapour produce deleterious effects in incandescent lamps, and this is true for lamps filled with gas as well as for vacuum-lamps. To remove the water vapour or deleterious gases, the incandescent lamps are exhausted as completely as possible while they are heated at the same time at a high temperature. It has been proposed to remove the last remainder of the gases, by placing hygroscopic materials such as $P_2O_5$ or BaO in the lamps. It is however very difficult to introduce such materials without affording at the same time an opportunity for taking up water vapour before the materials exercise the drying effect. It is also known to introduce red phosphorous into the lamps. This forms, when heated, yellow phosphorus which may eliminate small quantities of water vapour. Even if phosphorus already has been introduced, it is however, very desirable to have a hygroscopic body capable of absorbing greater quantities of water.

It has also been proposed to introduce metal compounds into the lamp, which when the lamps are heated during the exhausting process are transformed into drying agents (Dutch Patent No. 4052 Ned. cla. 21 f.).

We have found that a good result is obtained by introducing into the lamp bodies which decompose by heating and which are transformed into drying agents, whereas the lamps are not heated during the exhausing operation above the temperature at which these bodies will decompose, or are not heated at all. After the lamps have been sealed, they may be heated above the said decomposing temperature. The exhausing of the lamps may take place in this way at at less cost and much more quickly, whereas in most cases it is sufficient to heat the lamps during a relatively short period, for example a few minutes.

As an example of a body which may be transformed into a drying agent phosphor-suboxide $P_4O$ may be used, which on heating to a temperature of about 350° C. will be decomposed and form phosphorus and phosphoruspentoxide. The phosphor-suboxide may be produced by the method of Michaelis and Arend (Annalen der Chemie, 314, 1901, p. 266); after the formation of $P_4O$ from ammonium-hypo-phosphite and acetic anhydride the obtained product is washed with much water. The product obtained in this way is pure $P_4O$, and is non-hygroscopic.

Another example of such a compound is barium trinitride, $BaN_6$, which will form barium and nitrogen when decomposed on heating.

What we claim is:

1. A process for the manufacture of electric incandescent lamps which consists in introducing into the lamp phosphorus sub-oxide $(P_4O)$, and exhausting said lamp while maintaining the temperature thereof at a point below that at which $P_4O$ decomposes.

2. A step in the process of the manufacture of devices comprising an envelope having a filament adapted to be heated which consists in placing within the envelope a non-hygroscopic substance adapted to be decomposed upon being heated to a given temperature to form a hydroscopic material, exhausting said envelope after the substance is introduced and while maintaining the temperature of the envelope below the point at which the substance decomposes, thereafter sealing off the envelope and then heating the envelope to a temperature sufficiently high to cause the substance to decompose to form a hygroscopic material within the sealed envelope.

3. In the manufacture of incandescent lamps, introducing phosphor sub-oxide, $P_4O$, exhausting said lamp substantially without heating and afterward heating the lamp, substantially as described.

Signed at The Hague this second day of November 1920.

ANTONIUS DE GRAAFF.
DIRK LELY, JR.